UNITED STATES PATENT OFFICE.

GEORGE WEDDELL, OF NEWCASTLE-UPON-TYNE, ENGLAND.

PROCESS OF MANUFACTURING TABLE-SALT.

SPECIFICATION forming part of Letters Patent No. 690,126, dated December 31, 1901.

Application filed March 27, 1901. Serial No. 53,134. (No specimens.)

*To all whom it may concern:*

Be it known that I, GEORGE WEDDELL, manufacturing chemist, a subject of the King of Great Britain, residing at 20 Grainger street west, Newcastle-upon-Tyne, England, have invented certain new and useful Improvements in Processes of Manufacturing Table-Salt, of which the following is a specification.

The object of my invention is to render common table or sea salt less liable to absorb moisture from the atmosphere by converting the deliquescent salts contained in it into others which are not so deliquescent.

The principal deliquescent salts which exist in ordinary salt are chlorid of calcium and chlorid of magnesium. These I convert into carbonate of calcium and carbonate of magnesium or phosphate of calcium and phosphate of magnesium by chemical reaction through intimate admixture and trituration of the salt which is in fine powder or small crystals with carbonate of soda or phosphate of soda, or both. Any carbonate or phosphate of soda may be employed; but I prefer the monocarbonate ($Na_2CO_3$) and the diphosphate, ($Na_2HPO_4$.) The nature of the reaction may be described by the following formula:

In the case of carbonate of soda being used, $$2Na_2CO_3 + CaCl_2 + MgCl_2 = CaCO_3 + MgCO_3 + 4NaCl.$$

In the case of phosphate, the change effected may be thus formulated:

$$2Na_2HPO_4 + CaCl_2 + MgCl_2 = MgHPO_4 + CaHPO_4 + 4NaCl.$$

The quantity of carbonate or phosphate required to effect the reaction should be varied according to the amount of chlorid of calcium or chlorid of magnesium present in the salt, which can be ascertained by analysis. The salt with which I have experimented requires from eight grains to twelve grains of the phosphate or carbonate of soda to each pound of salt.

The method in which I proceed is as follows: Having ascertained the amount of phosphate or carbonate required by the salt, I take a weighed quantity of the phosphate or carbonate and in a mortar, mixing-machine, or other suitable vessel mix it with a small quantity of the salt. I then gradually add the remainder of the properly-calculated quantity of salt and continue the admixture or trituration until such time as the substances are intimately incorporated. The moisture usually present in the salt induces chemical action, which is further facilitated by the intimate admixture or trituration. I usually add the phosphate or carbonate in powder; but should the salt with which I am working be very dry I sometimes make a strong solution of the carbonate or phosphate and mix it in this form with the salt; but the total quantity of moisture present should not exceed one-half of one per cent. When the particles of salt have been brought by admixture into such close contact with the particles of phosphate or carbonate that chemical action has been induced or rendered possible, the compound is then heated for several hours at a temperature not exceeding 212° Fahrenheit, which by vaporizing the moisture contained in it still further facilitates the chemical reaction.

What I claim is—

The process of converting the deliquescent salts, usually existing in common salt, into non-deliquescent salts, which consists in admixing, triturating and heating together a sodium salt of an oxygen acid and common salt in a finely-divided state but containing only a minute quantity of moisture.

GEORGE WEDDELL.

Witnesses:
 THOS. JAMESON,
 T. R. HUTCHINSON.